UNITED STATES PATENT OFFICE.

HARRY O. CHUTE, OF CLEVELAND, OHIO.

PROCESS OF MAKING WOOD-ALCOHOL.

No. 824,906.  Specification of Letters Patent.  Patented July 3, 1906.

Application filed March 31, 1906. Serial No. 309,115.

*To all whom it may concern:*

Be it known that I, HARRY OWEN CHUTE, residing at Cleveland, in the county of Cuyahoga and State of Ohio, have invented certain new and useful Improvements in Processes of Making Wood-Alcohol, whereof the following is a specification.

This invention relates to processes of making wood-alcohol; and it consists in a method of isolating the same from crude pyroligneous acid by a series of distillatory and other steps, all as more fully hereinafter set forth, matters of novelty being particularly pointed out in the appended claims.

In the art the term "wood-alcohol" is used to denote methyl alcohol containing more or less acetone and other low-boiling constituents of pyroligneous liquor or acid.

Pyroligneous liquor or acid is the aqueous portion of the condensed products from the vapors arising from the destructive distillation of wood, separated as far as possible by settling from the tar and other insoluble impurities, and it consists, essentially, of a watery solution of acetic and other acids, methyl alcohol, acetone, and certain other substances of minor importance. In addition, it is invariably contaminated by oily bodies held in solution and suspension by the influence of the acetic acid, &c. Other impurities consist of aldehydes and higher ketones, which are unstable and are sensitive to alkali polymerizing and resinifying in presence of excess of base.

It is the object of the present invention to treat crude pyroligneous acid by a simple, ready, and cheap method for the recovery of the several values thereof, doing this by an organized succession or steps, each resulting in the formation of a valuable product, and the several steps of the method as a whole coöperating to deliver purified wood-alcohol in commercial form.

A number of methods are now in use for recovering wood-alcohol from this pyroligneous liquor. One much used in chemical works employing retorts preliminarily distils the whole bulk of volatile liquid to get rid of nonvolatile impurities comprising "tar," &c. This distillate is barely neutralized with lime to form acetate and the alcohol distilled from the neutral liquid so formed. It is necessary to guard against excess of alkali, which here polymerizing and resinifying the unstable impurities would render the acetate impure, slimy, and hard to dry. Unfortunately the oily bodies, which are foul-smelling, distil with the acid and dissolve in it on account of its great bulk and on redistillation accompany the alcohol on account of their high vapor tension, rendering it milky on addition of water.

In another method much used in kiln charcoal plants an attempt is made in the first distillation to effect a rough separation of alcohol and acid, and for this purpose it is customary to distil off somewhat more than one-half to obtain the alcohol. This distillate contains considerable acid and is quite dilute, not usually containing more than three per cent. of alcohol. The residue in the still is substantially free of alcohol. This weakness of the distillate is due to the large volume distilled over. Besides the acid and the three per cent. of alcohol it contains the objectionable impurities referred to. In a distillate of this nature and strength they are apparently held in solution or suspension, or both. The next operation performed is to neutralize and fractionate off the alcohol previous to evaporating the neutralized liquor for acetate. Here, again, the oily impurities are reinforced on neutralization and pass forward to contaminate the alcohol, and the other unstable bodies are not polymerized or condensed, owing to lack of excess of alkali.

The same is true of a third process used for making "brown acetate"—*i. e.*, acetate containing tar—in which the pyroligneous acid is directly neutralized and distilled to obtain the alcohol. I have, however, discovered that in an acid distillate containing between ten and twenty-five per cent. of alcohol these oily impurities are substantially insoluble and settle out readily. Some are, no doubt, retained by the acid liquor in the still in making such a concentrated distillate.

In my new process I therefore directly fractionate the pyroligneous acid in any suitable still arranged to deliver concentrated distillates, such as an ordinary continuous-column still, carrying on the distillation so as to obtain a distillate between the strengths mentioned—viz., ten to twenty-five per cent. of alcohol. This distillate I allow to stand and settle for some time. Of the codistilled impurities going over with the wood-spirit many are insoluble in spirit of this strength and separate in oily droplets, coalescing on standing as a heavy underlying oily layer. These oils have great solvent properties and are useful for dissolving many organic compounds which are not acted upon by ordinary organic solvents. Because of their strong odor they are also useful for denaturizing grain-alcohol. Other impurities, however, are soluble and remain in and contaminate the supernatent layer of spirit. These latter impurities I find are quite sensitive to the action of alkali, being probably largely ketonoid or aldehydic in their nature and with alkali polymerizing or resinifying with formation of tarry insoluble bodies. Therefore, after decanting the alcohol from the separated oily bodies I add an excess of an alkali, as lime. Reaction soon sets in, as is shown by the development of yellow color, the familiar color known and carefully avoided in working with pyroligneous acid as an evidence of overliming. It is here, however, advantageous and not detrimental. As the reaction progresses alkali-resinous matters separate and form a precipitate. These resinous bodies formed by the action of the alkali on the aldehydic and ketonic impurities form a mass of novel and useful characteristics, it being substantially a dye resin, being susceptible of use as a dyestuff, as it stains organic matters bright yellow when properly applied, and also of use as a resin. Being formed from a liquid from which the oily and tarry impurities have been removed by previous treatments, it is substantially pure. I do not claim this material herein specifically, but reserve the right to file a separate application therefor. The spirit decanted from this precipitate will be found much improved in quality, having been freed from these two classes of impurities, and I am therefore enabled to directly rectify in any rectifying continuous column producing by this one redistillation alcohol of standard eighty-two per cent. strength, but of such purity that it is miscible with water in all proportions and cannot be refractionated into portions "milking" with water.

It is obvious that the described process makes practical a ready, cheap, and simple preparation of a high-grade alcohol directly from crude pyroligneous acid.

To recapitulate, my process in its preferred embodiment consists in fractionating pyroligneous acid in the acid state to obtain a concentrated distillate of such alcoholic strength that oily impurities become insoluble preferably between ten and twenty-five per cent., settling out the separated oily impurities, drawing off the clear liquid from the settlings, polymerizing and resinifying alkali sensitive impurities with alkali in excess, and refractionating to obtain a perfectly-miscible strong alcohol.

What I claim is—

1. The process of preparing wood-alcohol from crude pyroligneous acid which consists in distilling from said acid a concentrated distillate of between ten and twenty-five per cent. alcoholic content and of acid nature allowing said distillate to stand to permit separation of impurities, and decanting off the clear liquid.

2. The process of preparing wood-alcohol from crude pyroligneous acid which consists in distilling from said acid a concentrated distillate of between ten and twenty-five per cent. alcoholic content and of acid nature, allowing said distillate to stand to permit separation of impurities, decanting off the clear liquid and adding thereto an excess of alkali.

3. The process of preparing wood-alcohol from crude pyroligneous acid which consists in distilling from said acid a concentrated distillate of between ten and twenty-five per cent. alcoholic content and of acid nature, allowing said distillate to stand to permit separation of impurities, decanting off the clear liquid, adding thereto an excess of alkali and decanting away from the resinous deposit formed.

4. The process of preparing wood-alcohol from crude pyroligneous acid which consists in distilling from said acid a concentrated distillate of between ten and twenty-five per cent. alcoholic content and of acid nature, allowing said distillate to stand to permit separation of impurities, decanting off the clear liquid, adding thereto an excess of alkali, decanting and refractionating the decanted liquid to produce strong alcohol.

5. The process of preparing wood-alcohol from crude pyroligneous acid which consists in distilling from said acid a concentrated distillate of between ten and twenty-five per cent. alcoholic content and of acid nature, allowing said distillate to stand to permit separation of impurities, decanting off the clear liquid, adding thereto an excess of alkali, decanting and refractionating the decanting liquid to produce perfectly-miscible alcohol of above eighty per cent.

6. The process of preparing wood-alcohol from crude pyroligneous acid which consists in distilling from said acid an acid product of an alcoholic strength wherein oily impurities are insoluble, allowing the same to stand to permit separation of such impurities, and decanting off the clear liquid.

7. The process of preparing wood-alcohol from crude pyroligneous acid which consists in distilling from said acid an acid product of an alcoholic strength wherein oily impurities are insoluble, allowing the same to stand to permit separation of such impurities, decanting off the clear liquid and adding thereto an excess of alkali.

8. The process of preparing wood-alcohol from crude pyroligneous acid which consists in distilling from said acid an acid product of an alcoholic strength wherein oily impurities are insoluble, allowing the same to stand to permit separation of such impurities, decanting off the clear liquid, adding an excess of alkali and decanting away from the resinous deposit formed.

9. The process of preparing miscible wood-alcohol from crude pyroligneous acid which consists in distilling from said acid an acid product of an alcoholic strength wherein oily impurities are insoluble, allowing the same to stand to permit separation of such impurities, decanting off the clear liquid, adding an excess of alkali, decanting away from the resinous deposit formed, and refractionating the decanted liquid to produce strong miscible alcohol.

10. The process of preparing wood-alcohol from crude pyroligneous acid which consists in distilling from such acid an acid product of an alcoholic strength wherein oily impurities are insoluble, allowing the same to stand to permit separation of such impurities, decanting off the clear liquid, adding an excess of alkali, decanting away from the resinous deposit formed, and refractionating the decanted liquid to form a strong alcohol of above eighty per cent. and perfectly miscible with water.

In testimony whereof I affix my signature in the presence of two witnesses.

HARRY O. CHUTE.

Witnesses:
  BLANCHE L. CHADWELL,
  K. P. McELROY.